UNITED STATES PATENT OFFICE.

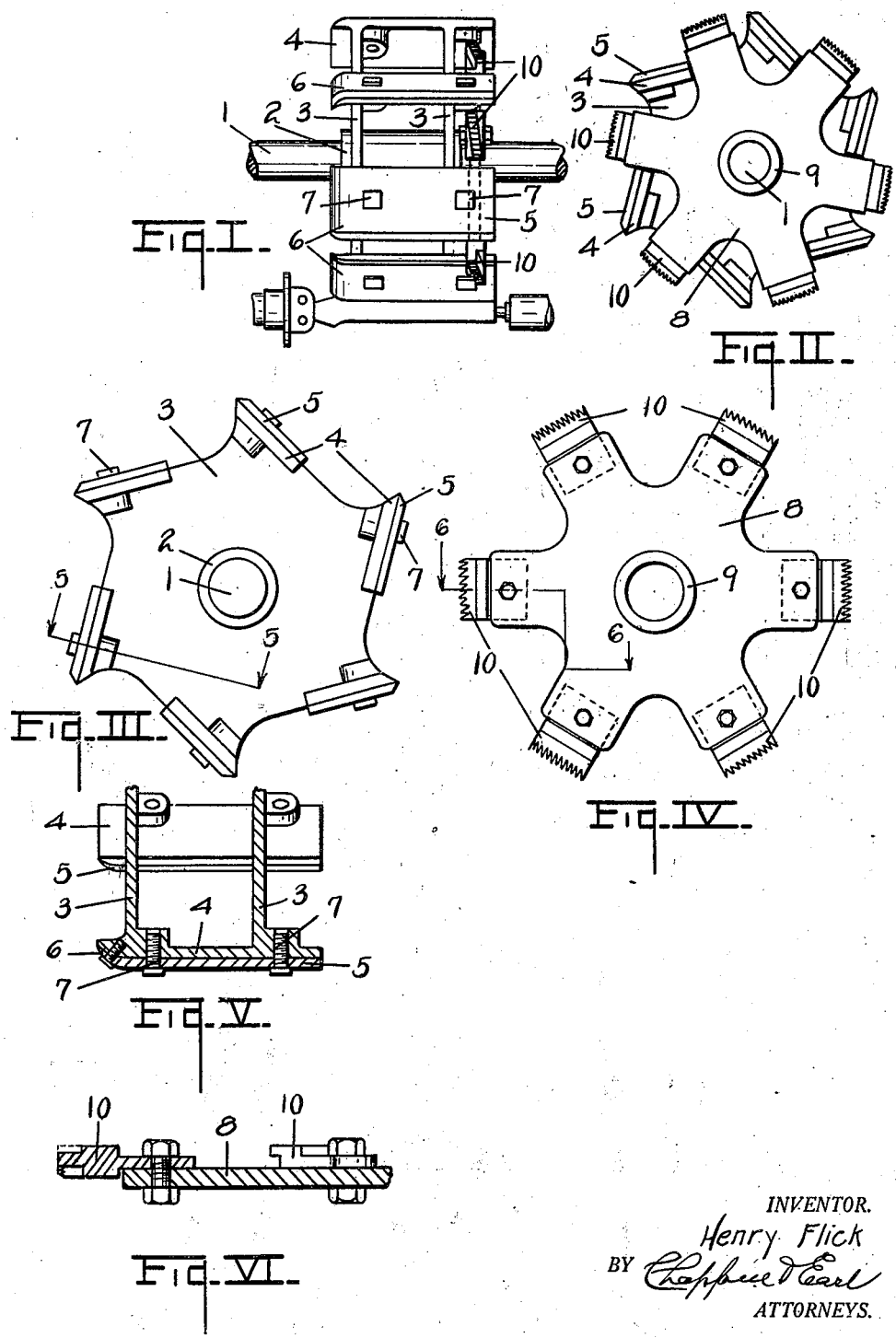

HENRY FLICK, OF JACKSON, MICHIGAN.

REVOLVING CUTTER HEAD FOR SPOKE-TURNING LATHES.

1,426,167.　　　　Specification of Letters Patent.　Patented Aug. 15, 1922.

Application filed October 4, 1921. Serial No. 505,242.

*To all whom it may concern:*

Be it known that I, HENRY FLICK, a citizen of the United States, residing at the city and county of Jackson, State of Michigan, have invented certain new and useful Improvements in Revolving Cutter Heads for Spoke-Turning Lathes, of which the following is a specification.

This invention relates to improvements in revolving cutter heads for spoke turning lathes, particularly those of the multiple spindle variety, although the cutter head is available wherever such cutter heads may be used.

The object of the invention is to provide in a single cutter head means for turning the body of the spoke and at the same time cutting an annular groove and forming the spoke tenon, all in proper relation to the head of the spoke.

Objects relating to details and economies of construction and operation will definitely appear from the detailed description to follow.

The objects of the invention are accomplished by the devices and means described in the following specification. The invention is clearly defined and pointed out in the claims.

A structure which is a preferred embodiment of the invention is fully illustrated in the accompanying drawing, forming a part of this application, in which:

Fig. I is a side elevation view of the improved cutter head shown in position for turning a spoke, the spoke being shown supported between suitable centers.

Fig. II is an end elevation of the structure appearing in Fig. I, showing the relation of the auxiliary cutters to the main cutters.

Fig. III is a similar elevation view of the main cutter.

Fig. IV is a similar elevation view of the auxiliary cutters.

Fig. V is a detail sectional view on line 5—5 of Fig. III, showing the contour of the main cutter and its manner of support.

Fig. VI is a detail sectional view on line 6—6 of Fig. IV, showing the arrangement and supporot of the dado saw tooth cutter for cutting the tenon groove around the spoke.

In the drawing similar numerals of reference refer to similar parts throughout the several views and the sectional views are taken looking in the direction of the little arrows at the ends of the section lines.

Considering the numbered parts of the drawing by their numbers, 1 is the shaft. 2 is the hub. 3, 3 the supporting plates and 4 the cross bars of the head. 5 is a cutter blade with the curved end part 6 corresponding to the contour of a spoke or part to be turned held in place by screws 7. 8 is the spider on the hub 9 carrying dado saws 10 oblique to the axis of rotation and supported between the straight projecting ends of the main cutter blade, so that the cutter head will not only turn the body of a spoke but will also cut an annular rim around the same to form the tenon. It is clear that the details of this structure can be greatly modified without departing from the invention.

Having thus described the invention, what is claimed as new and desired to secure by Letters Patent, is:

The combination of a cutter head with main blades curved at one end and straight at the other, and a spider with obliquely disposed saws at the outer ends of its arms disposed between the straight ends of the said blades whereby a groove is cut at the same time the body of a spoke is turned, as specified.

In witness whereof I have hereunto set my hand and seal.

HENRY FLICK. [L. S.]